ELECTROMAGNETIC WAVE ENERGY FILTERING

Filed March 22, 1962 2 Sheets-Sheet 1

IRVING KAUFMAN
WILLIAM H. STEIER
INVENTORS

BY Benjamin DeWitt

ATTORNEY

ELECTROMAGNETIC WAVE ENERGY FILTERING

Filed March 22, 1962 2 Sheets-Sheet 2

IRVING KAUFMAN
WILLIAM H. STEIER
INVENTORS

BY Benjamin DeWitt

ATTORNEY 3,212,034
Patented Oct. 12, 1965

3,212,034

ELECTROMAGNETIC WAVE ENERGY FILTERING

Irving Kaufman, Woodland Hills, Calif., and William H. Steier, Champaign, Ill., assignors, by mesne assignments, to TRW Inc., a corporation of Ohio Filed Mar. 22, 1962, Ser. No. 181,531
6 Claims. (Cl. 333—73)

The present invention relates to electromagnetic wave energy translation methods and systems, and more particularly to arrangements and methods for bandpass filtering in the microwave frequency range.

The method and apparatus of the invention find one application in the art of microwave receivers, where there has been a need for nonmechanical methods of tuning across a broad band of frequencies while maintaining a high degree of receiver selectivity. In many other high frequency and microwave system applications, it is desirable to have a relatively narrow instantaneous R.-F. bandwidth which can be tuned quickly and easily over a wide range of frequencies. Until recently, there has been no practical method of accomplishing such tuning with passive instrumentalities.

The present invention provides a method of and apparatus for microwave preselector filtering which can be electrically tuned over a wide range of frequencies with a relatively low insertion loss. Moreover, while the present invention has immediate and obvious utility in its application to microwave reception techniques, in its broader aspects it may readily have other applications for selective translation and propagation of other types of wave energy. For example, it is considered that the general principles of the method and apparatus of the present invention are applicable to the entire waveguide band and to pre-transmission filtering of signals which are to be transmitted in a limited frequency spectrum, such as single sideband communication systems and the like.

In the prior art there is one known tunable microwave filter device, which uses the principle of gyromagnetic resonance in single-crystal yttrium-iron-garnet (YIG) to achieve a resonant structure, whose resonant frequency can be changed or tuned by means of variable magnetic filters. (See article entitled "Magnetically-Tunable Microwave Filters Using Single-Crystal Yttrium-Iron-Garnet Resonators," by Philip S. Carter, Jr., in IRE Transactions on Microwave Theory and Techniques, volume MTT–9, number 3, May 1961.) That prior art device has the very substantial disadvantage that it requires strong magnetic fields which necessarily must be provided by solenoid arrangements either alone or in combination with permanent magnets. Such magnetic field providing structures magnify the size and weight of the system and give rise to substantial power consumption. Moreover, such magnetic field activated devices cannot be used in areas or in equipment where stray magnetic fields cannot be tolerated. In addition, ferrimagnetic resonance devices are limited in frequency range by the so-called low field losses, which prevent operation at the lower microwave frequencies.

Accordingly, it is a broad object of the present invention to provide an improved method and system for discriminating between electrical waves of different frequencies which features wide-range nonmechanical tunability and improved selectivity and avoids the prior art requirement of variably controllable magnetic fields.

It is another object of the invention to provide an improved method and system for wave energy filtering employing narrow-band resonance characteristics of elongated plasma columns.

It is a further object to provide an improved apparatus for selectively and individually translating a plurality of electromagnetic wave signals which jointly occupy a common frequency band.

It is a still further object of the invention to provide an improved electrically tunable bandpass filter apparatus which is tunable over an extremely wide band of frequencies in the microwave region and which enables low-loss translation of signals within a selected relatively narrow band together with substantially complete exclusion of signals having frequencies outside that selected band.

Briefly described, the present invention utilizes the known phenomenon of dipole resonance in an elongated plasma column and employs that resonance characteristic in a novel method and apparatus for bandpass filtering of microwave signals. In accordance with one exemplary embodiment of the invention, a plasma column enclosed in an insulative tube is positioned to extend transversely through the walls of a waveguide so that radiation propagated along the waveguide has its electric field vector polarized substantially perpendicular to the axis of the plasma column. When so arranged, and with the plasma column being energized by a longitudinal discharge current passing therethrough, the transverse microwave electric fields produce oscillatory transverse displacement of the electron cloud of the plasma relative to the comparatively stationary positive ion cloud. Substantially all the electrons in an incremental cross-section portion of the plasma column move transversely to the axis of the column in a coherent or common time phase manner.

At the instant of time when the electron cloud has maximum transverse displacement, energy is stored in the form of electrostatic field potential, both internally and externally of the column. At the instant of time when the electron cloud is minimally displaced, the electrons have a maximum transverse velocity representing a maximum kinetic energy. The natural frequency of the transverse electronic oscillation is dependent upon a number of physical factors including primarily the free electron density, or degree of ionization of the plasma. By controlling the longitudinal discharge current passing through the plasma column, the resonant frequency of the plasma may be tuned over a wide range of frequencies, and readily may be adjusted to the frequency of a selected input signal which is desired to be reproduced. By coupling an output circuit to the oscillating external electric field of the plasma in such a manner that it is non-responsive to the input radiation propagated along the waveguide, the present invention enables reproduction of those selected input signals which are within the narrow bandpass of the plasma and substantially complete rejection of other extraneous signals, such as wideband noise, jamming signals, and the like.

The foregoing and other objects and features of the present invention will be more clearly understood from the following description taken with the accompanying drawings throughout which like reference characters indicate like parts, which drawings form a part of this application and in which.

Figures 1, 2:
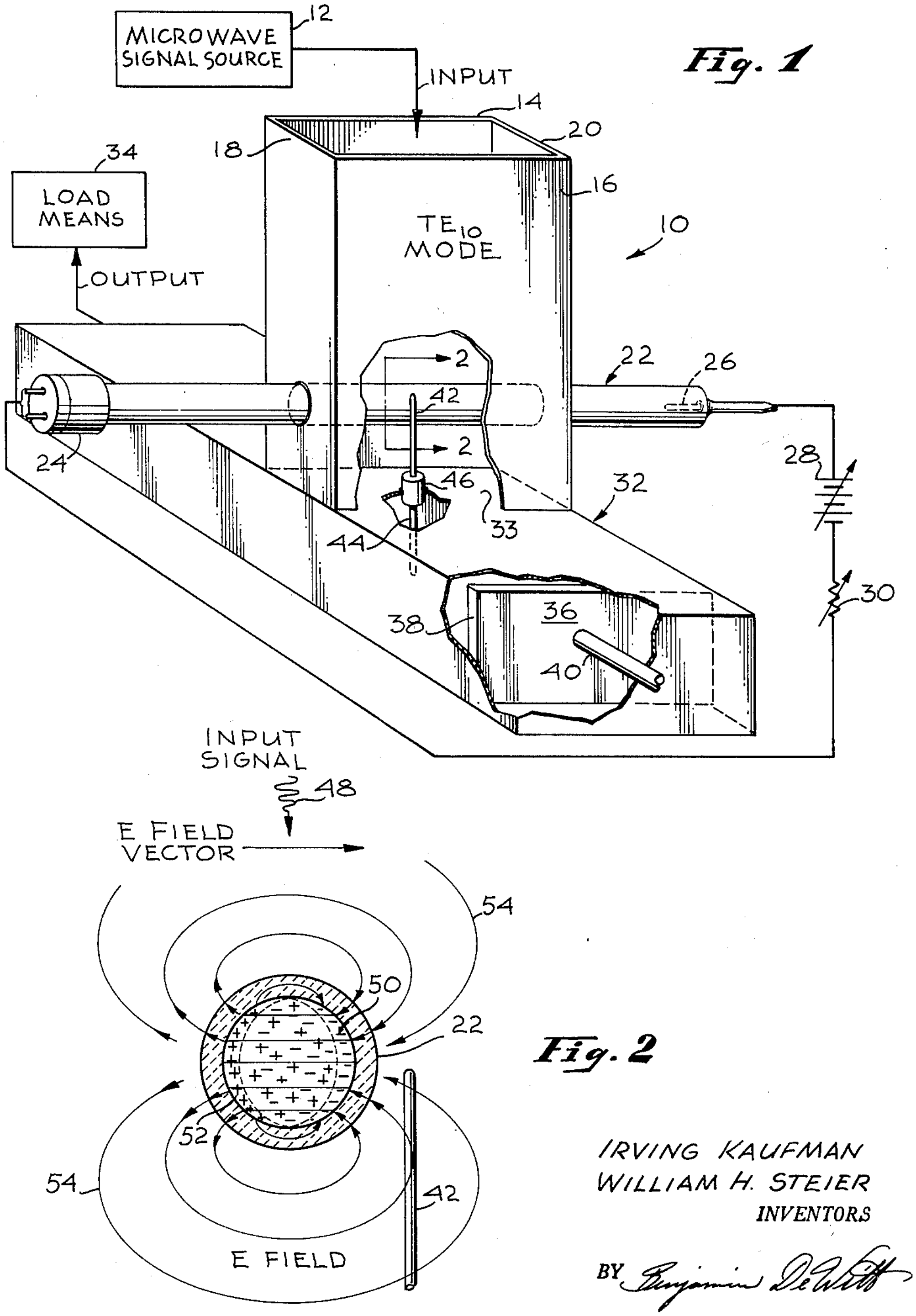
FIGURE 1 is a partially broken away perspective view illustrating an arrangement embodying the method and apparatus of the invention.
FIG. 2 is a cross-sectional view taken along the lines 2—2 of FIG. 1.

In FIG. 1 there is shown, by way of example, a microwave signal receiving system embodying the invention in the form of a method and apparatus for tunable bandpass filtering of received signals. Specifically, a first section of rectangular waveguide 10, having wide side walls 14 and 16 and narrow side walls 18 and 20, is provided with input microwave signals from a microwave signal source 12, which source may comprise, for example, the receiving antenna of a microwave communication system. Signals from source 12 are propagated downwardly along the rectangular waveguide 10 in the $TE_{10}$ mode, that is, with the electric field vector of the waves extending substantially perpendicularly between the side walls 14 and 16 and perpendicular to the direction of propagation. The waveguide 10 is joined at its lower end to a second waveguide section 32 which extends perpendicularly to the first waveguide section. The upper wall of the second waveguide 32 closes the lower end of the first waveguide 10 and thereby provides a short-circuiting element 33 across the lower end of the waveguide 10. An elongated gas discharge device 22 is passed through the narrow side wall portions 18 and 20 in an orientation such that the discharge tube and the ionized gas plasma column contained within the tube 22 are substantially normal to the direction of propagation of the input waves and normal to the electric field vector of said waves. Preferably, the plasma tube 22 is spaced one-quarter wavelength from the short-circuiting element 33 at the lower end of waveguide 10. That spacing provides a maximum electric field intensity in the vicinity of the plasma tube 22. At the right-hand end of the second waveguide section 32, there is provided a tuning means 36 which includes a longitudinally movable piston or shorting member 38 and an outwardly extending shaft 40 connected to the shorting member 38 for adjusting its position along the waveguide section 32. At the left-hand end of the section 32, it is coupled by any one of various appropriate conventional arrangements to a load means 34 which may, for example, comprise a crystal mixer and associated circuitry as conventionally used in microwave receivers.

Coupling between the first waveguide 10 and the second waveguide 32 is provided by means of a pick-up probe 42 which extends upwardly from the shorting end member 33 to a position closely adjacent the plasma tube 22. The pick-up probe 42 is supported in an insulating bushing 46 which passes through the common wall of the two waveguide sections. Pick-up probe 42 is directly and electrically connected to a quarter-wave stub 44 which extends downwardly from the bushing 46 into the second waveguide section 32. It should be here observed that the pick-up probe 42 preferably extends axially into the first waveguide 10 from the short-circuiting element 33. Accordingly, probe 42 is not directly responsive to the $TE_{10}$ mode waves which are propagated along the waveguide from the input end. Rather, pick-up probe 42 responds substantially exclusively to the microwave electric fields created by the plasma column in the discharge tube 22, as will be described more extensively hereinafter.

The cathode end 24 of discharge tube 22 is electrically connected, as diagrammatically illustrated, through a current limiting resistor 30 to a variable direct current voltage source 28 which is diagrammatically illustrated as a battery. The positive terminal of the battery 28 is connected to the anode end 26 of the plasma tube 22. The plasma tube may comprise any one of various hot cathode gas discharge devices. For example, a hot cathode mercury vapor tube has been used in conjunction with apparatus as depicted in FIG. 1.

It has been found that for best operation of the present invention the plasma column provided by the discharge tube 22 should be long in relation to its diameter, preferably longer by a factor of about ten or more. However, if a long discharge tube is used, excessively large voltages are necessary to initiate and maintain the plasma discharge. In S-band waveguide (1½" x 3") a discharge tube only slightly longer than the distance between the narrow walls 18 and 20 of the waveguide 10 may be used provided that the diameter of the discharge tube is commensurately restricted; that is, if a discharge tube four or five inches in length is to be used, it should have a plasma column diameter of preferably not more than 5/16". While the present invention is not restricted to such apparatus or such relative dimensions, it will be apparent that use of the shortest practical discharge device which satisfies the basic criteria for plasma resonance has the immediate advantage of a lower voltage drop during operation and a lower firing voltage requirement. It has been found that the operating current of such a preferred discharge device may be of the order of 500 milliamperes at a forward voltage drop of about 100 volts and a starting or firing voltage of about 1500 volts.

Full appreciation of the present invention in all its aspects requires a brief consideration of the principles of plasma resonance. Electronic oscillation in a volume of ionized gas plasma was recognized and reported as early as 1931 by L. Tonks in an article entitled "Plasma-Electron Resonance, Plasma Resonance and Plasma Shape," in Phys. Rev. 1931, vol. 38, pp. 1219–1223, and has since been further investigated by others (cf. N. Herlofson, "Plasma Resonance in Ionospheric Irregularities," in Arkiv f. Fysik, 1951, vol. 3, page 247). It has been demonstrated that a cylindrical plasma column suspended in free space or arranged generally as illustrated in FIG. 1, when illuminated by a beam of electromagnetic wave energy having its electric field vector substantially normal to the column, will produce wave energy reflection and absorption at certain frequencies dependent upon the plasma density. The resonant plasma response to the incoming E-field is essentially a coherent oscillation of the plasma electrons in a direction parallel to the E-field and transverse to the plasma column. Physical visualization of the plasma electronic oscillation is illustrated in FIG. 2 as transverse oscillatory displacement of an electron cloud 50 oscillating in the vertical direction relative to the comparatively stationary ion cloud 52. FIG. 2, of course, represents an elementary cross-section of the plasma column which is contained within the discharge tube 22 of FIG. 1.

The near electric fields produced externally of the plasma column are the same as those of a line of electric dipoles. Thus, the plasma behavior appropriately can be regarded as "dipole resonance." It has been determined that a plasma column will exhibit dipole resonance at a primary resonant frequency given by $$\omega_r = \omega_p / \sqrt{1 + K_{eff}} \qquad (1)$$

where:

$\omega_r$ is the resonant frequency, $\omega_p$ is the plasma angular frequency $$= (5.6 \times 10^4) \times (\text{number of electrons})^{1/2}$$

and $K_{eff}$ is the effective relative dielectric constant of the materials and the region surrounding the plasma.

The value of the constant $K_{eff}$ is dependent upon the geometry of the plasma discharge tube and its environmental surroundings. For a special analytically convenient case wherein a cylindrical plasma discharge tube is assumed to be coaxially positioned in a cylindrical metal tube, it can be shown that the effective relative dielectric constant is given by the following expression:

$$K_{eff}=K_e\left\{\left(\frac{b}{a}\right)^2\left[K_e+1-\left(\frac{b}{d}\right)^2(K_e-1)\right]-\left[K_e-1-\left(\frac{b}{d}\right)^2(K_e+1)\right]\right\}\left\{\left(\frac{b}{a}\right)^2\left[K_e+1-\left(\frac{b}{d}\right)^2(K_e-1)\right]+\left[K_e-1-\left(\frac{b}{d}\right)^2(K_e+1)\right]\right\}^{-1} \quad (2)$$

where:

$K_e$=the relative dielectric constant of the discharge tube;
$a$=the plasma column radius;
$b$=the outer radius of the discharge tube;

and $d$=the metal tube inner radius.

Obviously, the above Equation 2 is not rigorously applicable to the arrangement of FIG. 1, where the plasma tube 22 is positioned asymmetrically within the waveguide section 10. However, it has been found that the wide walls 14 and 16 exert approximately the same influence on the resonant frequency of the system as would a conductive cylinder having a radius of the order of three times the plasma discharge tube radius. For various asymmetrical structural arrangements such as that of FIG. 1, it has been found reasonably accurate to use the geometric mean of the values of $\sqrt{1+K_{eff}}$ computed from Equation 2 for the two special cases of $d$=infinity and $d$=5 mm. Furthermore, Equation 1 was derived on the basis of a plasma column of infinite length. For the practical case of a column of finite length, the resonant response splits into an infinite set of resonant modes, whose resonant frequencies lie near the angular frequency given by Equation 1. By using a column of high ratio of length to diameter, the lower order and important modes are forced to coalesce to the resonant frequency given by Equation 1. By positioning the probe near the center of the column, the principal, lowest order mode is excited far stronger than the other modes.

In FIG. 2 the incoming electromagnetic wave designated by the numeral 48 traverses the discharge tube 22 and thereby induces transverse oscillatory movement of the electron cloud 50 relative to the ion cloud 52. As described heretofore, the transversely displaced electron cloud produces an external electric field as indicated by the field lines 54. The oscillatory near field represented by lines 54 cuts across the pick-up probe 42 and induces therein a high frequency signal corresponding in frequency and amplitude to the dipole resonant oscillation of the plasma column. Referring again to FIG. 1, the signal thus developed in pick-up probe 42 is coupled directly to the quarter-wave stub 44 and is therefrom propagated along waveguide section 32 and coupled to the signal utilization load means 34.

If the frequency of the input radiation 48 is not related to the plasma density in the discharge tube in a manner to satisfy Equation 1, the dipole resonant mode of the plasma cannot be excited, the pick-up probe 42 will not be excited, and no power will be coupled to the output waveguide section 32. However, if the plasma density is related to at least one frequency component of the input wave energy as specified by Equation 1, that particular component of the input wave energy will strongly excite the plasma column, and the pick-up probe 42 will couple power from the near fields of the resonating column to the output waveguide section 32. The wave energy coupled to the output waveguide 32 will correspond in frequency and amplitude to the particular selected frequency component of the frequency heterogeneous input wave energy. The system is, therefore, a microwave bandpass filter or frequency discriminating apparatus, with the output load receiving power only at the frequency $\omega_r$ as determined by the plasma density and Equation 1. By variably controlling the longitudinal discharge current applied to the discharge tube from direct current source 28, the plasma density may be controlled to any desired value within a wide range. Thus, the selected frequency at which power will be coupled from the input waveguide 10 to the output waveguide 32 can be varied over a wide frequency range. Moreover, if desired, an electronic amplifier or the like may be connected in circuit with the source 28 and used to modulate the discharge current amplitude to provide electronic tuning of the microwave filter.

Figure 3:
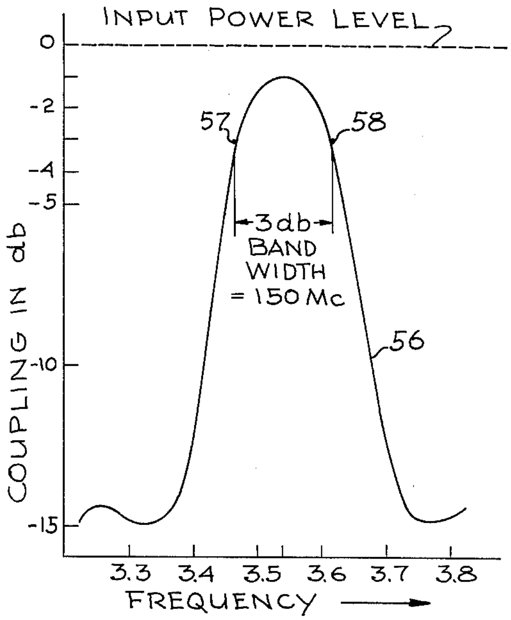
FIG. 3 is a graph of the frequency response characteristic of the apparatus illustrated in FIG. 1.

FIG. 3 illustrates the bandpass characteristic of the apparatus of FIG. 1. In FIG. 3, frequency is plotted as the abscissa, and the ordinate axis represents the power output in decibels relative to an arbitrary input power level. On curve 56 of FIG. 3, points 57 and 58 indicate the half-power points or the frequencies at which the output power is down 3 db from the input power. With a center frequency of 3540 mc., as indicated in FIG. 3, the apparatus of FIG. 1 provides a bandwidth of 150 mc. between the half-power points 57 and 58. The relatively narrow bandpass provided by the apparatus and method of the present invention is particularly advantageous in microwave communication and pulsed radar systems, where it is desirable to provide maximum rejection of wideband noise and other undesired signals such as, for example, intentional jamming.

To achieve low insertion loss at the center frequency in a bandpass filter in accordance with the present invention, it is necessary that the resonant plasma column be strongly overcoupled to the input and output systems. Such overcoupling is achieved in the arrangement of FIG. 1 by placing the plasma discharge tube 22 approximately one-quarter wavelength at the waveguide frequency from the short-circuiting element 33, and by placing the pick-up probe 42 as near as possible to the outside of the discharge tube 22.

The bandwidth of any bandpass filter is determined by the loaded Q ($Q_L$) of the system. As pointed out above, to achieve low insertion loss, the resonating member must be overcoupled to the input and output systems, so that the external Q ($Q_E$) will be from three to four times smaller than the unloaded Q ($Q_U$) of the resonant member. This means that the $Q_L$ of the system will be from four to five times smaller than $Q_U$. If it is desired to have the bandpass as narrow as possible, it is necessary to provide the highest possible $Q_U$ of the resonant plasma column. The $Q_U$ of the dipole resonant plasma column is determined largely by the collision frequency $\mu_c$ of the gas used in the plasma discharge device. To achieve a narrow bandpass, it is therefore desirable to select a gas and a gas pressure to give the lowest possible value of the collision frequency $\mu_c$.

Figure 5:
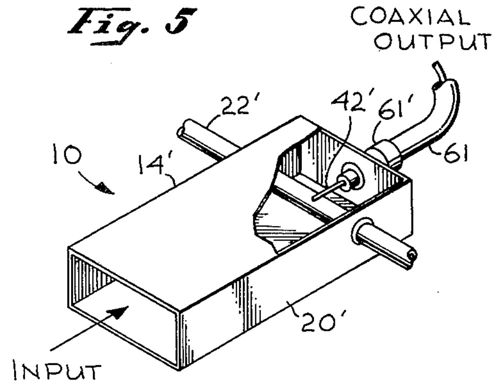
FIG. 5 is a diagrammatic illustration of another embodiment of the invention.

In FIG. 5 there is illustrated a further embodiment in accordance with the present invention wherein the selected signal corresponding to the resonant frequency of the plasma column is coupled out of the system by means of a coaxial line 60 which serves instead of the second waveguide section 32 of FIG. 1. All other components of the system of FIG. 5 may be identical to the components of the input waveguide portion of the apparatus of FIG. 1, and accordingly such components of the apparatus of FIG. 5 are designated by primes of the same numerals used in FIG. 1. It will be appreciated that the embodiment of FIG. 5 operates substantially the same as described heretofore with reference to the apparatus of FIG. 1. Specifically, frequency heterogeneous wave energy is applied to the left end of the waveguide 10' and is propagated therealong in the $TE_{10}$ mode to excite the transversely extending plasma discharge tube 22'. The right-hand end of the waveguide 10' is shorted in the conventional manner, and the plasma tube 22' is spaced one-quarter wavelength from the short-circuiting element. A conventional coaxial connector 61' is mounted on the short-circuiting element, and the E-field pick-up probe 42' is directly connected to and forms an extension of the center conductor of the coaxial connector 61. Otherwise the pick-up probe 42' is identical to the corresponding probe 42 of the apparatus of FIG. 1.

As stated above, the embodiment of FIG. 5 is normally operated with the input wave energy applied to the plasma column from the waveguide 10' and with the band-limited output signal extracted by way of probe 42' and coaxial output line 60. However, since the plasma column is a reciprocally operative element, it is evident that the apparatus can operate reversely, with the input frequency heterogeneous signal being applied through the coaxial line 60 and being coupled to the plasma column by probe 42'. The filtered output signals are then extracted by waveguide 10' and applied therefrom to any conventional utilization means. The fact of reciprocal operability has been confirmed experimentally for both the apparatus of FIG. 5 and that of FIG. 1.

Figure 6:
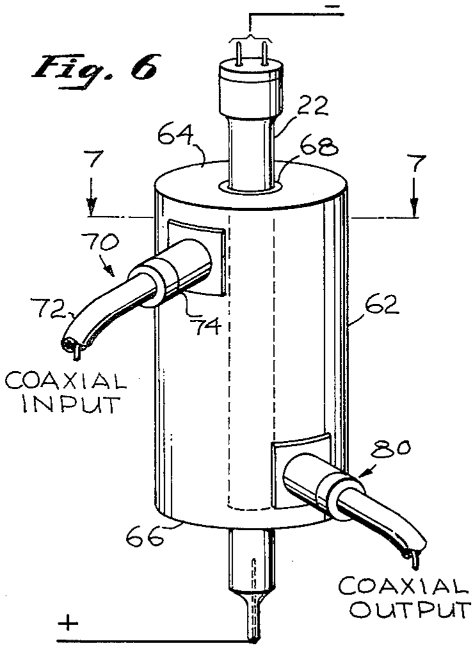
FIG. 6 is a perspective view of another apparatus in accordance with the invention.
Figure 7:
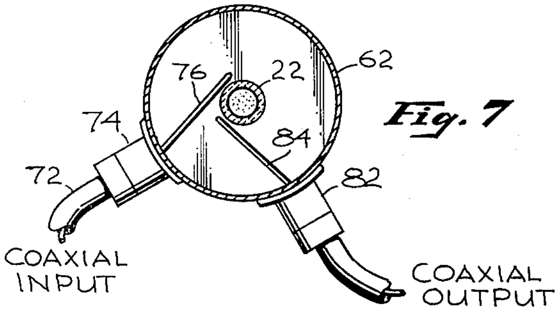
FIG. 7 is a cut-away end view of the apparatus of FIG. 6.

As indicated above, the plasma column resonator may be effectively excited by means of a probe positioned closely adjacent thereto. It follows that various permutations of the previously disclosed input and output coupling methods and coupling elements are feasible. One such alternative embodiment in accordance with the invention is illustrated in FIGS. 6 and 7, wherein the plasma discharge device 22 is positioned coaxially through a right cylindrical metallic shielding member 62. The cylindrical shield member 62 is closed at its opposite ends by end plates 64 and 66 which have central apertures to accommodate the plasma discharge tube 22. Microwave signals to be bandpass filtered are applied to the plasma discharge tube 22 by way of coaxial input means 70 which comprises a coaxial line 72, a conventional type "N" coaxial connector 74, and an input probe 76 conductively connected to and supported by the center conductor of the coaxial connector 74. The input coaxial connector is secured on the exterior of the shield member 62 near the upper end thereof. A structurally similar coaxial signal output means 80 is positioned near the opposite end of the shield member 62, with the output coaxial connector 82 being similarly secured to the exterior of the shield 62 and with the output probe 84 being similarly conductively connected to and supported by the center conductor of the coaxial connector 82. The purpose of positioning the input coupling means near one end of the shield 62 and the output coupling means near the other end is to minimize direct coupling between the probes 76 and 84. To further minimize such coupling, it is highly desirable that the probes 76 and 84 be substantially perpendicular to each other. To that end, the input coaxial connector 74 and the output coaxial connector 82 are preferably angularly spaced apart by 90° around the periphery of the shield cylinder 62.

Figure 4:
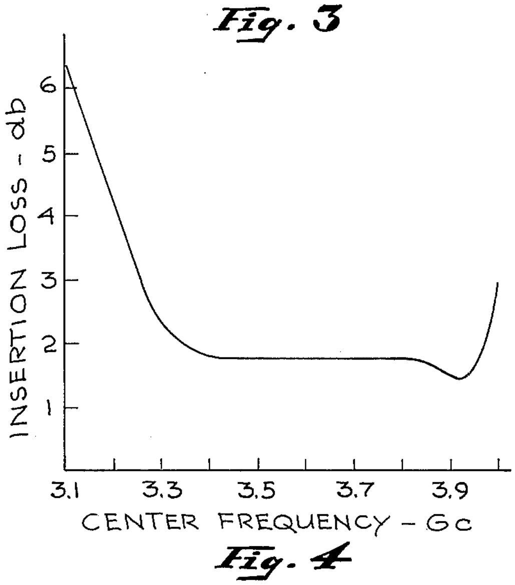
FIG. 4 is a graph of the insertion loss characteristic of the same apparatus.

The operation of the embodiment illustrated in FIGS. 6 and 7 is essentially the same as that discussed in detail heretofore in connection with FIGS. 1 and 5. It should be noted that when the plasma column contained within the discharge tube 22 is energized by a longitudinal direct current therethrough, the single probe 76 is effective to excite dipole resonance along the entire length of the plasma column. Thus, when the plasma column is energized and its electron density is adjusted to a value enabling plasma resonance at the frequency of the applied input signal, in accordance with Equation 1, a narrow-band filtered output signal may be coupled from the plasma column by output probe 84. Because of the fact that the plasma resonance extends along the entire length of the discharge tube at substantially the same amplitude, the plasma column provides a high degree of intercoupling at the plasma resonant frequency between the input probe 76 and the output probe 84. Thus, at the center frequency, the insertion loss is minimal, as indicated by FIGS. 3 and 4.

In an apparatus adapted for use in the microwave frequency range, the device illustrated in FIG. 6 may have a diameter of less than 3 inches and an axial length of about 4 to 5 inches. It will be appreciated that such a compact and economically manufacturable structure, not requiring auxiliary permanent magnets or solenoids, is particularly advantageous as a component of microwave communication systems for use in aircraft and the like.

The bandpass filtering methods and apparatus of the present invention require no magnetic fields such as are required by the ferrite microwave filters used heretofore. Moreover, the bandpass filters of the present invention can be easily and rapidly tuned over a wide frequency range by electronic tuning arrangements. The input and output coupling methods which may be used are effective over a wide frequency range.

Apparatus constructed in accordance with the present invention may take many physical forms. Accordingly, it is intended that the invention should not be limited by the herein-described details, and it will be obvious to those skilled in the art that it is not so limited but is susceptible of various changes and modifications without departing from the spirit and scope of the invention.

The embodiments of the invention in which an exclusive property or privilege is claimed are defined as follows:

1. In a microwave apparatus for selectively translating one of a plurality of input signals which individually occupy different frequency bands having bandwidths of the order of 80 to 320 megacycles:

waveguide means, adapted to receive all said input signals, for threalong propagating frequency heterogeneous electromagnetic radiation corresponding to said signals with the oscillatory electric fields of said radiation being polarized in a direction substantially perpendicular to the direction of propagation;

a short circuiting element connected to said waveguide means at the end thereof toward which said radiation is propagated;

an elongated gas-filled electric discharge device extending transversely through said waveguide in a direction substantially normal to the direction of propagation for providing, when critically energized, an elongated plasma column having its longitudial axis substantially normal to the oscillatory electric fields of said radiation so that said electric fields induce coherent oscillatory displacement of the electron cloud of said plasma relative to the ion cloud, with said displacement being in a direction substantially parallel to the oscillatory electric field vector of the radiation propagating in said waveguide and transverse to the longitudinal axis of said plasma column;

said discharge device being located in said waveguide means approximately one quarter wavelength from the end thereof to which said short circuiting element is connected;

discharge current supply means, connected to said discharge device, for selectively establishing the free electron density of said plasma at a value to satisfy the relation $$\omega_r = \frac{5.6 \cdot 10^4 \sqrt{N}}{\sqrt{1+K}}$$

wherein:

$\omega_r$ is the angular frequency of a selected one of said signals,

K is the composite effective dielectric constant of said discharge device, and

N is the selectively established free electron density of said plasma in electrons per cubic centimeter;

said selectively established free electron density being effective to provide resonant transverse oscillatory displacement of said electron cloud at the frequency of said selected one of said signals whereby said column produces narrowband plasma resonance radiation having an amplitude which varies as a function of the amplitude of said selected one of said signals; and pickup means, including an elongated conductive probe positioned adjacent said plasma column and substantially normal to the direction of polarization of said electric field vector, for substantially exclusively coupling to the narrowband plasma resonance radiation which emanates from said column as a consequence of said oscillatory displacement to thereby produce output signals corresponding to said selected one of said signals and substantially independent of the rest of said input signals.

2. In a microwave apparatus for selectively translating at least one of a plurality of input signals which individually occupy different frequency ranges within the microwave portion of the spectrum;

waveguide means for propagating frequency heterogeneous electromagnetic radiation corresponding to said signals with the oscillatory electric fields of said radiation being polarized substantially perpendicular to the direction of propagation;

an elongated gas-filled electric discharge device extending transversely through said waveguide in a direction substantially normal to said direction of propagation for providing, when critically energized, an elongated plasma column having its longitudinal axis substantially normal to the oscillatory electric fields of said radiation so that said electric fields induce coherent oscillatory displacement of the electron cloud of said plasma relative to the ion cloud, with said displacement being in a direction substantially parallel to the oscillatory electric field vector of the radiation propagating in said waveguide and transverse to the longitudinal axis of said plasma column;

discharge current supply means for selectively establishing the free electron density of said plasma at a value to satisfy the relation $$\omega_r = \frac{5.6 \cdot 10^4 \sqrt{N}}{\sqrt{1+K}}$$

wherein:

$\omega_r$ is the angular frequency of a selected one of said signals,

K is the composite effective dielectric constant of said discharge device, and

N is the free electron density of said plasma in electrons per cubic centimeter;

said selectively established free electron density being the critical density for resonant transverse oscillatory displacement of said electron cloud at the frequency of said selected one of said signals whereby said column produces narrowband plasma resonance radiation which varies as a function of the amplitude of said selected one of said signals; and pickup means, including an elongated probe positioned adjacent said discharge device and substantially normal to the polarization of said electric field vector, for substantially exclusively coupling to said narrowband plasma resonance radiation to thereby produce output signals corresponding to said selected one of said signals and substantially independent of the rest of said input signals.

3. In a microwave apparatus for exclusively translating a selected one of a plurality of input signals which individually occupy different frequency ranges within the microwave portion of the spectrum;

waveguide means, for propagating frequency heterogeneous electromagnetic radiation corresponding to said signals with the oscillatory electric fields of said radiation being polarized substantially perpendicular to the direction of propagation;

an elongated gas-filled electric discharge device extending transversely across said waveguide for providing, when critically energized, an elongated plasma column having its longitudinal axis substantially normal to the oscillatory electric fields of said radiation so that said electric fields induce oscillatory displacement of the electron cloud of said plasma relative to the ion cloud with said displacement being substantially parallel to the electric field vector of said radiation and normal to said longitudinal axis;

discharge current controlling means for establishing, in said plasma, a specific density of free electrons which satisfies the relation $$\omega_r = \frac{5.6 \cdot 10^4 \sqrt{N}}{\sqrt{1+K}}$$

wherein:

$\omega_r$ is the angular frequency of said selected one of said signals,

K is the composite effective dielectric constant of said discharge device, and

N is the free electron density of said plasma in electrons per cubic centimeter;

said specific density being the critical density for resonant oscillation of said electron cloud at the frequency of said selected one of said signals whereby said column produces plasma resonance radiation having an amplitude which varies as a function of the amplitude of said selected one of said signals; and pickup means positioned closely adjacent said discharge device, for substantially exclusively coupling to said plasma resonance radiation and providing output signals corresponding substantially exclusively to said selected one of said signals.

4. In combination with a microwave energy source which characteristically produces a desired first signal and at least one undesired second signal with the frequency separation between said first and second signals being at least of the order of 30 megacycles;

waveguide means, coupled to said source, for propagating electromagnetic radiation corresponding to both said first and second signals with the oscillatory electric fields of said radiation being polarized substantially perpendicular to the direction of propagation;

an elongated gas-filled electric discharge device extending transversely through said waveguide in a direction substantially normal to said direction of propagation for providing, when critically energized, an elongated plasma column having its longitudinal axis substantially normal to said oscillatory electric fields so that said electric fields induce oscillatory displacement of the electron cloud of said plasma relative to the ion cloud, with said displacement being in a direction substantially parallel to the electric field vector of the radiation propagating in said waveguide and normal to said longitudinal axis;

discharge current supply means, connected to pass direct current longitudinally through said discharge device for establishing therein a plasma having a critical density of free electrons which satisfies the relation $$\omega_r = \frac{5.6 \cdot 10^4 \sqrt{N}}{\sqrt{1+K}}$$

wherein:

$\omega_r$ is the angular frequency of said first signal,

K is the composite effective dielectric constant of said discharge device, and

N is the density of free electrons in said plasma expressed in electrons per cubic centimeter;

said critical density being the free electron density which enables resonant transverse oscillatory displacement of said electron cloud at the frequency of said first signal whereby said column produces plasma resonance radiation having an amplitude which varies as a function of the amplitude of said first signal; and pickup means, positioned closely adjacent said discharge device, for substantially exclusively coupling to said plasma resonance radiation to derive output signals substantially exclusively representative of said first signal and independent of said second signal.

5. In combination:

an elongated gas discharge device having a longitudinal axis and having a length at least an order of magnitude greater than the minimum cross-sectional diameter thereof;

means including a waveguide for providing input microwave radiation and applying the same to said device in a manner such that the oscillatory electric field vector of said radiation is oriented substantially normal to the longitudinal axis of said device;

means for ionizing the gas within said device to a critical degree such that the same forms a plasma having a free electron density satisfying the relation $$\omega_r = \frac{\omega_p}{\sqrt{1+K}}$$

wherein:

$\omega_p = 5.6 \cdot 10^4 \sqrt{N}$ $\omega_r$ is the frequency of a selected frequency domain component of said input microwave radiation, K is the composite effective dielectric constant of said device, and N is the number of free electrons per cubic centimeter of said plasma;

said microwave radiation inducing coherent oscillatory displacement of the electron cloud of said plasma relative to the ion cloud, with said displacement being in a direction substantially parallel to the electric field vector of said microwave radiation and substantially normal to the longitudinal axis of said plasma column whereby said column produces plasma resonance radiation of said frequency $\omega_r$;

an output signal transmission means; and an elongated probe oriented substantially normal to the electric field vector of said input microwave radiation for coupling output signals from said plasma column to said transmission means;

said probe having first and second portions, with said first portion being closely coupled to said plasma column and said second portion being coupled to said transmission means so that said probe is excited substantially only by the plasma resonance radiation emanating from said plasma column, and the output signals coupled to said transmission means are substantially exclusively representative of said coherent oscillatory displacement of the electron cloud.

6. An electronically tunable microwave bandpass filter comprising:

a plasma column having a critical degree of ionization such that the plasma exhibits transverse oscillation of the electron cloud of the plasma relative to the ion cloud at an effective resonant frequency $$\omega_r = \frac{5.6\sqrt{N} \cdot 10^4}{\sqrt{1+K}}$$

wherein:

$\omega_r$ is the center frequency of a selected narrow frequency band,

N is the number of free electrons per cubic centimeter in said plasma, and

K is the composite effective dielectric constant of said plasma column;

excitation means including a source of microwave energy for applying microwave radiation to said column with the electric field vector of said radiation polarized substantially normal to the axis of said plasma column;

said microwave radiation inducing coherent oscillatory displacement of the electron cloud of said plasma relative to the ion cloud, with said displacement being in a direction substantially parallel to the electric field vector of said microwave radiation and substantially normal to the longitudinal axis of said plasma column whereby said column produces plasma resonance radiation of said resonant frequency;

an output signal transmission means; and a pickup device, having first and second portions, for deriving microwave output signals which are substantially exclusively representative of those components of said microwave radiation which correspond to said resonant frequency, said first portion being closely coupled to said plasma column and oriented to be substantially exclusively responsive to the plasma resonance radiation emanating from the plasma column, and said second portion being coupled to said output signal transmission means in a manner to provide for low-loss transmission of signals corresponding to said coherent oscillatory displacement.

References Cited by the Examiner

UNITED STATES PATENTS

| | | | |
|---|---|---|---|
| 2,106,770 | 2/38 | Southworth | 333—98 |
| 2,413,963 | 1/47 | Fiske | 333—98 |
| 2,524,290 | 10/50 | Hershberger | 333—98 |
| 2,557,180 | 6/51 | Fiske | 333—98 |
| 2,567,701 | 9/51 | Fiske | 333—98 |
| 2,706,072 | 4/55 | Mumford | 331—78 |
| 2,745,072 | 5/56 | Goldstein | 333—98 |
| 2,773,245 | 12/56 | Goldstein | 333—98 |
| 2,806,974 | 9/57 | Haeff | 315—3.6 |

OTHER REFERENCES

Gould and Trivelpieces: "Plasma Columns," published in Journal of Applied Physics, vol. 30, #11, November 1959, pp. 1784–1793.

Herschberger: Journal of Applied Physics, vol. 31, February 1960, pp. 417–22.

BSTJ: "A Broad Band Microwave Noise Source," by Mumford, vol. 28, pp. 608–18.

Tonks: Physical Review, 1931, vol. 38, pages 1219–1223.

HERMAN KARL SAALBACK, *Primary Examiner.*